Patented June 20, 1950

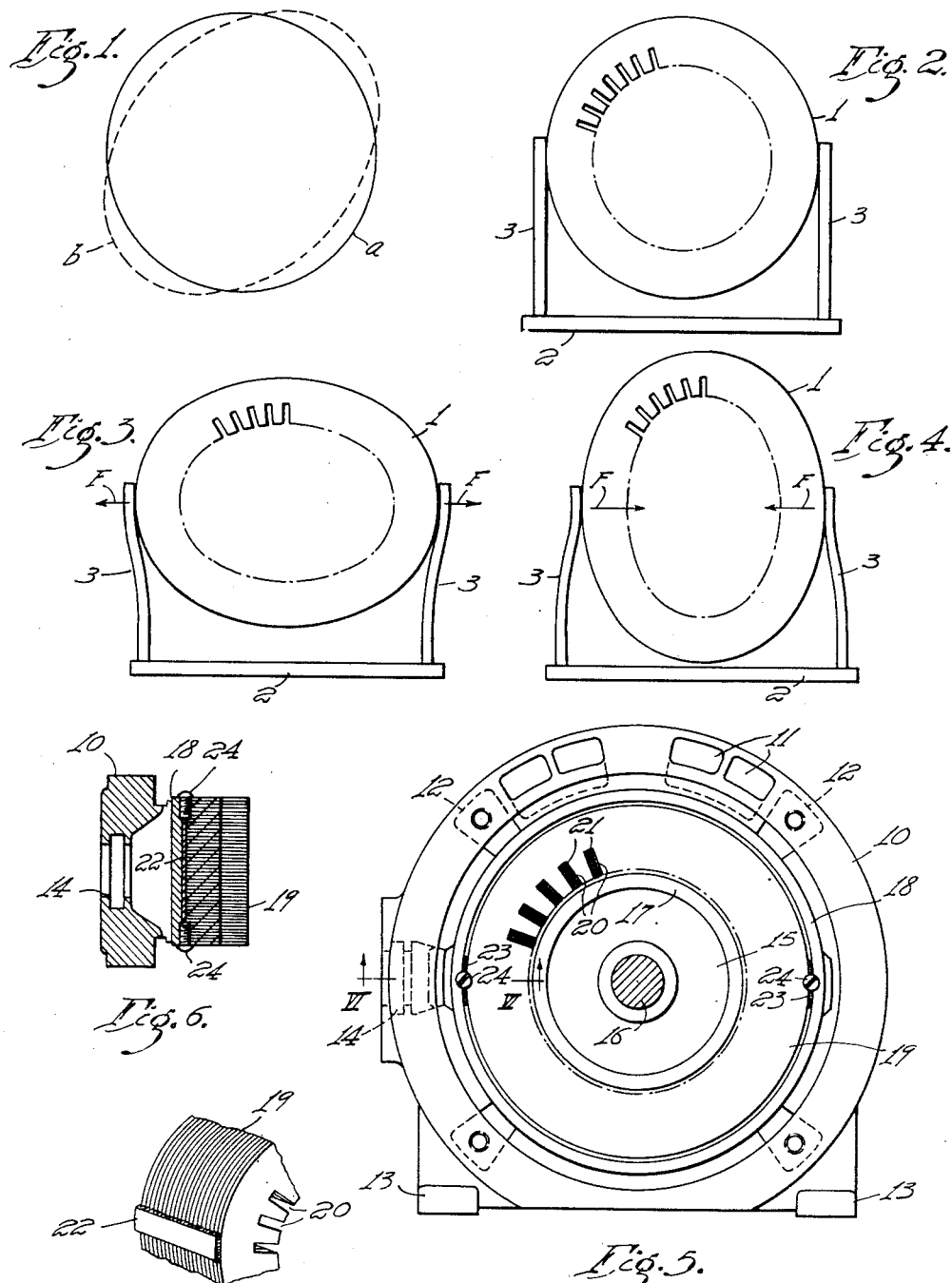

2,512,406

UNITED STATES PATENT OFFICE 2,512,406

DYNAMOELECTRIC MACHINE

Bernard B. Winer, Pittsburgh, Pa., assignor to Westinghouse Electric Corporation, East Pittsburgh, Pa., a corporation of Pennsylvania Application June 8, 1946, Serial No. 675,344

11 Claims. (Cl. 172—36)

The present invention relates to the construction of dynamoelectric machines, and more particularly to means for preventing, or materially reducing, the transmission of stator core vibration to the base of the machine, and to the supporting structure on which the machine is mounted.

In two-pole alternating-current dynamoelectric machines, the magnetic field between the stator and rotor members distorts the annular stator core into a slightly elliptical shape, and this elliptical distortion rotates with the rotating magnetic field at synchronous speed. This rotating distortion causes vibration of the stator core at a frequency equal to twice the frequency corresponding to the speed of rotation of the magnetic field, since each point in the core goes through two cycles of vibration in each complete revolution of the magnetic field. In conventional constructions in which the stator core is pressed into the frame, or is otherwise supported with a substantial part of the peripheral surface of the core engaging the frame of the machine, this double-frequency vibration is transmitted to the frame and to the support on which the machine is mounted.

In many applications of alternating-current machines, this double-frequency vibration is highly objectionable. Thus, in the case of electric motors used for driving machine tools, which are usually mounted either directly on the machine tool, or on the same base, the vibration is transmitted to the machine tool itself, and causes irregularities or markings on the work. Such irregularities cannot be tolerated where great accuracy or precision is required, and this problem has become very troublesome, so that it has become necessary to prevent the transmission of stator core vibration from the driving motor to its support.

The vibration in the stator core of a dynamoelectric machine is not objectionable, in itself, since its amplitude is relatively small, and it has no adverse effect on the stator windings, or on the operation of the machine. It is usually impractical to make the core or the frame of a dynamoelectric machine sufficiently rigid to reduce the amplitude of the core vibration within acceptable limits, and the problem therefore resolves itself into preventing the transmission of the vibration from the core to the frame of the machine, or to the support on which it is mounted. One way in which this can be done, which has been successfully used in machines of large size, is to mount the core resiliently in the frame by means of a spring support, so that the resilient mounting absorbs the vibration and prevents its transmission to the frame. The principal object of the present invention is to provide a different means for preventing transmission of the core vibration to the support on which the machine is mounted, which is simpler and less expensive than the use of a resilient mounting, and is therefore better adapted to machines of smaller size, such as industrial motors, although it will be obvious that the invention is not limited to machines of any particular size, and can be applied equally well to larger machines.

More specifically, the object of the invention is to provide an alternating-current dynamoelectric machine in which the stator core is supported in the frame in such a way that the vibratory distorting forces transmitted to the frame, as a result of the core vibration, are substantially equal in magnitude and opposite in direction, so that they balance each other, and thus no substantial vibration is produced in the base of the machine or its support.

A further object of the invention is to provide a construction for alternating-current dynamoelectric machines in which the stator core is supported in the frame only at two diametrically opposite points on the peripheral surface of the core, and is free of the frame at all other points. The diametrically opposite points at which the core is supported are preferably located so that the vibration of the core at those points is substantially only radial in direction, and has no tangential component, or only negligibly small tangential components. If this condition is approximately satisfied, the forces transmitted to the frame will be equal and opposite, and no substantial vibration will occur in the base of the machine.

The invention will be more fully understood from the following detailed description, taken in connection with the accompanying drawing, in which:

Figure 1 is a diagram illustrating the nature of the stator core distortion;

Figs. 2, 3 and 4 are diagrammatic views illustrating the principles of the present invention;

Fig. 5 is an end view of an alternating-current dynamoelectric machine embodying the invention, the end bracket being omitted for clarity of illustration;

Fig. 6 is a sectional view approximately on the line VI—VI of Fig. 5; and

Fig. 7 is a fragmentary perspective view of a portion of the stator core.

As explained above, the double-frequency vibration of the stator core in an alternating-current dynamoelectric machine is caused by distortion of the core by magnetic forces. This distortion is illustrated in Fig. 1, in which the solid circle $a$ represents the normal, or undistorted, position of the neutral axis of the cylindrical stator core of an alternating-current dynamoelectric machine, the core being considered as a curved beam. In the case of a two-pole machine, when the machine is energized, the two-pole magnetic field distorts the core from its normal circular shape into a slightly elliptical shape, as indicated by the dotted ellipse $b$ of Fig. 1, the distortion being greatly exaggerated in the figure for the purpose of illustration. The magnitude of the magnetic force which produces the distortion is proportional to the square of the flux density in the air gap, and since the elliptical distortion is the direct result of this magnetic force, it is inherent in any two-pole machine and cannot be avoided. When the machine is in operation, the rotating magnetic field causes the elliptical distortion to rotate at the same speed as the rotating field, that is at synchronous speed. It will be apparent from Fig. 1 that any point in the stator core goes through two cycles of vibration in each complete revolution of the magnetic field, so that the frequency of the core vibration is equal to twice the frequency corresponding to the speed of rotation of the magnetic field, or 120 cycles per second in the case of a motor energized from a 60-cycle supply.

It can be shown mathematically that the path of movement of any point on the neutral axis of the stator core is an ellipse, having its major axis in the radial direction and twice the length of the minor axis. As points inside the neutral axis, the motion of any point in the core is still elliptical, but the minor axis increases relative to the major axis as the radius to the point decreases, so that in the region of the teeth the motion at any point in the core approaches a circle. Outside the neutral axis, the minor axis of the elliptical path of a point in the core decreases with increasing distance from the neutral axis until, at a radius equal to ⁴⁄₃ the radius of the neutral axis, the minor axis of the path of a point in the core becomes zero, and the motion is entirely radial. Thus, at this particular radius, the motion of any point in the core is in the radial direction only, while at points of less radius the motion of a point in the core has both radial and tangential components.

Figs. 2, 3 and 4 show diagrammatically the principles of the present invention, in which the stator core of an alternating-current machine is mounted in such a manner that substantially no vibration is transmitted to the base of the machine. Fig. 2 shows the stator core member 1 supported in a frame, or supporting structure, which is represented diagrammatically by a base or bed plate 2 with vertical supports 3 at each side. The supporting structure, consisting of the base 2 and the supports 3, is relatively rigid, and the stator core 1 is secured to the supports 3 at two diametrically opposite points substantially in the horizontal central plane of the core. The points at which the core 1 is attached to the supports 3 are preferably located at a radial distance from the neutral axis of the core at which the vibratory movement of any point in the core is substantially radial, with no tangential component, or with only a negligibly small tangential component, although in actual practice it is not absolutely necessary for the core to be supported exactly at these points.

The effect of this manner of mounting the core is shown in Figs. 3 and 4, which show the distorted shape of the core during operation of the machine, the distortion being greatly exaggerated for clarity. Fig. 3 shows the shape of the core at a moment when the elliptical distortion of the core has its major axis horizontal. It will be noted that in this position the forces F acting on the supports 3 are directed radially outward, and are substantially equal in magnitude. The relatively rigid supports 3 will be slightly deflected, but since the forces acting on them are equal and opposite, these forces will balance, and cause substantially no deflection of the base 2. The forces applied to the base 2 tend to put it in tension, and there is no bending or distortion of the base 2 other than a negligibly small amount caused by the bending moments of the forces F about the bottom of the supports 3, and this distortion is extremely small because of the rigidity of the supporting structure.

Fig. 4 shows the conditions prevailing when the magnetic field of the machine has rotated 90° from the position of Fig. 3, so that the major axis of the elliptically distorted stator core is vertical. It will be noted that in this position, the forces F acting on the supports 3 are directed radially inward and are again of substantially the same magnitude, so that although the supports 3 are slightly deflected inwardly, the forces acting on the base 2 are equal and opposite, and cause no distortion or deflection of the base 2, but merely tend to put it in compression.

Thus, as the elliptical distortion of the core rotates, the forces applied to the supporting structure are always equal and opposite, and no appreciable distortion or deflection of the base occurs, so that there is no noticeable vibration in it, and no vibration is transmitted to a foundation or support on which the machine is mounted. It will be observed that this result is obtained by mounting the stator core in its supporting structure at two diametrically opposite points only, and preferably by locating these points radially of the core so that the motion of the core at the supporting points is substantially radial with no tangential components. As pointed out above, the radial location of these points can be determined mathematically, but in actual practice it can best be found by test, and considerable variation from the theoretically preferred location is permissible without affecting the effectiveness of the construction in preventing vibration in the base of the machine. It has been found that in stator cores of usual design, the proportions are such that the peripheral surface of the core is sufficiently close to the desired radial distance from the neutral axis, and if such a core is mounted in a frame at two diametrically opposite points only, substantially no vibration will occur in the base of the machine.

A practical embodiment of the invention in an actual machine is shown in Figs. 5, 6 and 7. Fig. 5 is an end view of an induction motor, with the end bracket omitted in order to show the construction of the machine. The motor shown in Fig. 5 has a frame 10, which may be of any suitable or usual construction, and which is illustrated as having passages 11 for circulation of external ventilating air, and passages 12 for circulation of the internal air. The frame 10 has feet, or supporting members, 13, and may have an opening 14 at one side for bringing out leads from the motor windings to a conduit box. The motor also has a rotor member 15 supported on a shaft 16. The rotor 15 may be of any suitable type, and is shown as a squirrel-cage rotor having short-circuiting end rings 17.

In applying the present invention to a machine of the more or less standard construction just described, a cylindrical steel bushing member or sleeve 18 is pressed into the frame so as to be rigidly supported in the frame. The cylindrical stator core 19 may be of the usual laminated construction, with slots 20 in its inner periphery for the reception of a suitable primary winding 21. The outside diameter of the stator core 19 is made slightly less than the inside diameter of the bushing 18, and the core 19 is preferably proportioned so that its outer peripheral surface is at such a radial distance from the neutral axis of the core that points on the outer surface will have substantially radial motion only when the core vibrates during operation of the machine, or at least have relatively small tangential components. As previously pointed out, this radial dimension can be determined analytically but is usually best found by test, and is sufficiently closely approximated in stator cores of usual design. The radial distance of the peripheral surface from the neutral axis is not critical, and it is usually not necessary to make any modification in standard core designs in order to apply the present invention.

A longitudinal projection 22 is formed on each side of the core 19, at two diametrically opposite points. Each of the projections 22 is preferably formed by welding a bead along the peripheral surface of the core from one end to the other, and building up the weld metal until a projection of the desired width and height is formed. It will be understood, however, that the projections 22 might be formed in any other desired manner, such as by punching the core laminations with suitable projections at each side. After the projections 22 have been formed on the core, the outer surfaces of the projections 22 are machined to a cylindrical surface with a diameter slightly greater than the inside diameter of the bushing 18. The core 19 is then pressed into the bushing 18 with the projections 22 engaging the bushing substantially on the horizontal central plane of the machine on each side. The core 19 is accurately centered longitudinally of the frame 10, and the projections 22 and core 19 are then welded to the bushing 18 at each end of each of the projections, as indicated at 23. Locating screws 24 are then inserted at each end of each of the projections 22 to positively retain the core in position and in longitudinal alignment.

It will be apparent that the core 19 is supported in the frame structure only at two diametrically opposite points, and is spaced from the frame structure at all other points, since its outside diameter is less than the inside diameter of the bushing 18. Thus, the core 19 is supported in the frame 10 in the manner diagrammatically illustrated in Figs. 2, 3 and 4, and the core can vibrate during operation of the machine without causing any noticeable vibration at the base of the machine, since the vibratory distorting forces applied to the frame by the core are always equal and opposite, and tend to balance each other without causing any distortion or deflection of the feet 13 of the frame, as shown in Figs. 3 and 4. Thus, a motor embodying this construction can be mounted directly on a machine to be driven by it, and no substantial vibration will be transmitted to the machine from the motor.

It should now be apparent that a construction for alternating-current dynamoelectric machines has been provided in which the transmission of stator core vibration to the base of the machine or to a supporting structure is substantially prevented. It will be apparent that although a specific embodiment of the invention has been shown and described for the purpose of illustration, the invention is capable of various other embodiments and modifications, and in its broadest aspects, it includes all embodiments and modifications which come within the scope of the appended claims.

I claim as my invention:

1. A dynamoelectric machine having a stator member and a rotor member, said stator member including a substantially rigid supporting structure and a generally cylindrical stator core member, said stator core member being subject to distortion by the magnetic forces between the stator core member and the rotor member, and said stator core being secured directly to the supporting structure at two diametrically opposite peripheral points only, the stator core being spaced from the supporting structure at all other points of its periphery.

2. A dynamoelectric machine having a stator member and a rotor member, said stator member including a substantially rigid supporting structure and a generally cylindrical stator core member, said stator core member being subject to distortion by the magnetic forces between the stator core member and the rotor member, and said stator core being secured directly to the supporting structure at two diametrically opposite peripheral points only, the stator core being spaced from the supporting structure at all other points of its periphery, the proportions of the stator core being such that the distortion of the core at said two peripheral points is substantially in the radial direction only.

3. A dynamoelectric machine having a stator member and a rotor member, said stator member including a substantially rigid frame, a generally cylindrical stator core, said stator core being subject to distortion by the magnetic forces between the stator core and the rotor member, and means for securing the stator core directly to the frame at diametrically opposite sides of the stator core only, the stator core being spaced from the frame at all other points of its peripheral surface.

4. A dynamoelectric machine having a stator member and a rotor member, said stator member including a substantially rigid frame, a generally cylindrical stator core, said stator core being subject to distortion by the magnetic forces between the stator core and the rotor member, and means for securing the stator core directly to the frame at diametrically opposite sides of the stator core only, the stator core being spaced from the frame at all other points of its peripheral surface, the proportions of the stator core being such that the distortion of the core at its periphery is substantially in the radial direction only.

5. A dynamoelectric machine having a stator member and a rotor member, said stator member including a substantially rigid frame structure and a generally cylindrical stator core, and said stator core being supported directly in the frame structure at two diametrically opposite portions of the peripheral surface of the stator core only, the stator core being spaced from the frame structure at all other points.

6. A dynamoelectric machine having a stator member and a rotor member, said stator member including a substantially rigid frame structure and a generally cylindrical stator core, and said stator core being supported directly in the frame structure by engagement of its peripheral surface therewith, said engagement being limited to two diametrically opposite portions of the peripheral surface of the core, and the core being spaced from the frame structure at all other points.

7. A dynamoelectric machine having a stator member and a rotor member, said stator member including a frame, a generally cylindrical stator core, and means for rigidly supporting said stator core in the frame, said supporting means engaging the peripheral surface of the stator core at two diametrically opposite positions only, the stator core being spaced from the frame at all other points.

8. A dynamoelectric machine having a stator member and a rotor member, said stator member including a frame structure and a generally cylindrical stator core, said stator core having means on its peripheral surface for engaging the frame structure to support the stator core rigidly therein, said engaging means being positioned at two diametrically opposite sides of the stator core, and the stator core being spaced from the frame structure at all other points.

9. A dynamoelectric machine having a stator member and a rotor member, said stator member including a frame structure and a generally cylindrical stator core, said stator core having two diametrically opposite longitudinal projections on its peripheral surface, said projections engaging the frame structure to support the stator core rigidly therein, and the stator core being spaced from the frame structure at all other points.

10. A dynamoelectric machine having a stator member and a rotor member, said stator member including a frame member, a generally cylindrical stator core, and a bushing member rigidly supported in the frame member, said bushing member having a cylindrical internal surface, and said stator core having two diametrically opposite longitudinal projections on its peripheral surface, said projections engaging the internal surface of the bushing member to support the stator core therein and to space it from the bushing member at all other points.

11. A dynamoelectric machine having a stator member and a rotor member, said stator member including a frame member, a generally cylindrical stator core, and a bushing member rigidly supported in the frame member, said bushing member having a cylindrical internal surface, said stator core having two diametrically opposite longitudinal projections on its peripheral surface, said projections engaging the internal surface of the bushing member to support the stator core therein and to space it from the bushing member at all other points, and means at each end of each of said longitudinal projections for securing the stator core to the bushing member.

BERNARD B. WINER.

REFERENCES CITED

The following references are of record in the file of this patent:

UNITED STATES PATENTS

| Number | Name | Date |
|---|---|---|
| 1,798,846 | Kennedy | Mar. 31, 1931 |
| 1,822,096 | Hollander | Sept. 8, 1931 |
| 2,217,788 | Blake | Oct. 15, 1940 |
| 2,378,669 | Vickers | June 19, 1945 |

OTHER REFERENCES

AIEE Transactions, pp. 283-288, June 1941.